US012784500B2

(12) United States Patent
Farsi et al.

(10) Patent No.: US 12,784,500 B2
(45) Date of Patent: Nov. 3, 2026

(54) APPARATUS, SYSTEM, AND METHOD FOR SENSING FACIAL EXPRESSIONS FOR AVATAR ANIMATION

(71) Applicant: Meta Platforms Technologies, LLC, Menlo Park, CA (US)

(72) Inventors: Saeed Farsi, San Diego, CA (US); Boon Shiu, Palo Alto, CA (US); Wei Huang, San Diego, CA (US); Jiang Zhu, Cupertino, CA (US); John Ho, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 317 days.

(21) Appl. No.: 18/542,835

(22) Filed: Dec. 18, 2023

(65) Prior Publication Data

US 2025/0124738 A1 Apr. 17, 2025

Related U.S. Application Data

(60) Provisional application No. 63/590,893, filed on Oct. 17, 2023.

(51) Int. Cl.
*G06V 40/16* (2022.01)
*G02C 5/00* (2006.01)
*G06T 13/40* (2011.01)

(52) U.S. Cl.
CPC ........... *G06V 40/176* (2022.01); *G02C 5/001* (2013.01); *G06T 13/40* (2013.01)

(58) Field of Classification Search
None
See application file for complete search history.

(56) References Cited

U.S. PATENT DOCUMENTS

2014/0347265 A1* 11/2014 Aimone .................. G06F 3/015 345/156
2019/0346928 A1 11/2019 Shahmohammadi
2021/0365535 A1* 11/2021 Castañeda .............. G06V 10/94
2022/0283351 A1* 9/2022 Shibata ................ C09J 133/066
2024/0265732 A1 8/2024 Ho et al.

FOREIGN PATENT DOCUMENTS

WO 2023219672 A1 11/2023
WO 2023219685 A1 11/2023

OTHER PUBLICATIONS

International Search Report and Written Opinion for International Application No. PCT/US2024/047902, mailed Dec. 9, 2024, 15 pages.

* cited by examiner

*Primary Examiner* — Lennin R Rodriguezgonzalez
(74) *Attorney, Agent, or Firm* — Foley & Lardner LLP

(57) ABSTRACT

An apparatus that facilitates and/or supports sensing facial expressions for avatar animation may include an eyewear frame dimensioned to be worn by a user. This apparatus may also include a plurality of radar devices secured to the eyewear frame. The plurality of radar devices may be configured to transmit a signal toward a facial feature of the user and/or to receive the signal from the facial feature of the user. Various other apparatuses, systems, and methods are also disclosed.

19 Claims, 11 Drawing Sheets

APPARATUS, SYSTEM, AND METHOD FOR SENSING FACIAL EXPRESSIONS FOR AVATAR ANIMATION

CROSS REFERENCE TO RELATED APPLICATION

This application claims the benefit of U.S. Provisional Application No. 63/590,893 filed Oct. 17, 2023, the disclosure of which is incorporated in its entirety by this reference.

BRIEF DESCRIPTION OF DRAWINGS

The accompanying drawings illustrate a number of example embodiments and are a part of the specification. Together with the following description, these drawings demonstrate and explain various principles of the instant disclosure.

Figure 1:
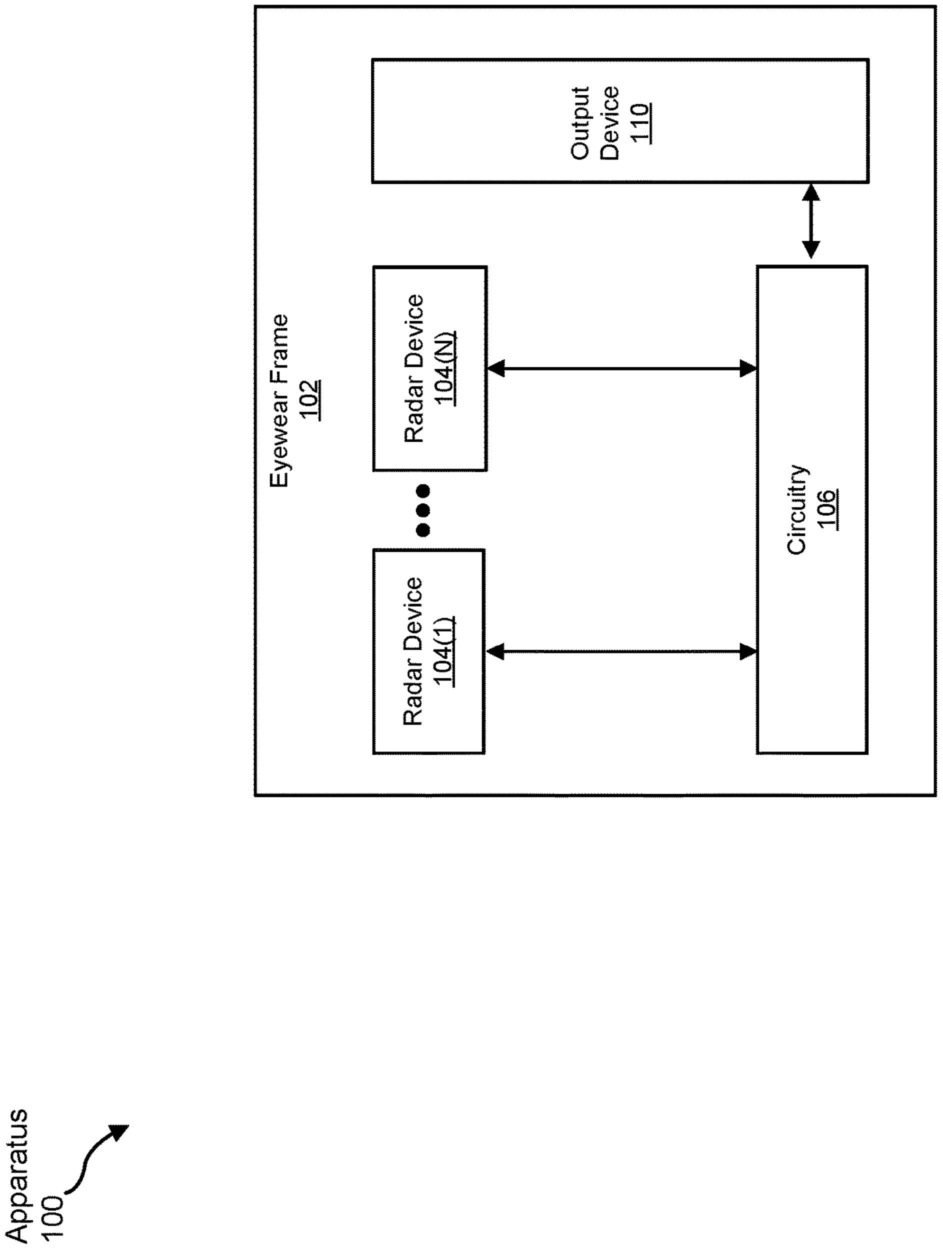
FIG. 1 is an illustration of an exemplary apparatus for sensing facial expressions for avatar animation according to one or more implementations of this disclosure.

While the exemplary embodiments described herein are susceptible to various modifications and alternative forms, specific embodiments have been shown by way of example in the appendices and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to apparatuses, systems, and methods for sensing facial expressions for avatar animation. As will be explained in greater detail below, these apparatuses, systems, and methods may provide numerous features and benefits.

In some examples, avatars may be animated in connection with artificial reality. Artificial reality may provide a rich, immersive experience in which users are able to interact with virtual objects and/or environments in one way or another. In this context, artificial reality may constitute and/or represent a form of reality that has been altered by virtual objects for presentation to a user. Such artificial reality may include and/or represent virtual reality (VR), augmented reality (AR), mixed reality, hybrid reality, or some combination and/or variation of one or more of the same.

In certain artificial-reality systems, cameras may be used to provide, facilitate, and/or support expression sensing and/or face tracking for avatar animation. Unfortunately, such cameras may have certain drawbacks and/or shortcomings in the context of expression sensing, face tracking, and/or avatar animation. For example, cameras may be relatively expensive and/or draw or consume relatively high amounts of power. Additionally or alternatively, cameras may be affected by or susceptible to occlusion and/or light conditions that render the images and/or video largely ineffective and/or unusable for the purpose of sensing users' facial expressions, tracking facial features, and/or animating avatars. Further, cameras may be positioned and/or aimed so close to users' faces that the images and/or video are rendered largely ineffective and/or unusable for the purpose of sensing users' facial expressions, tracking facial features, and/or animating avatars.

The apparatuses, systems, and methods described herein may provide, facilitate, and/or support expression sensing and/or face tracking for avatar animation via a set of radar devices incorporated into an artificial-reality system, such as a VR head-mounted display (HMD) and/or an AR HMD. As a specific example, a user may wear an artificial-reality HMD that includes and/or represents two or more radar devices that are directed and/or aimed toward certain facial features whose movement and/or shape are representative of and/or relevant to sensing the user's facial expressions. In one example, the two or more radar devices may each include and/or represent a millimeter-wave radar module equipped with one or more transmitter elements and one or more receiver elements.

In some examples, AR may be accomplished, provided, and/or facilitated by smart glasses. In one example, a pair of smart glasses worn by a user may include and/or represent a frame and/or front frame in which a pair of lenses are inserted and/or installed. In this example, the frame and/or front frame of the smart glasses may be equipped with a radar device under each of the lenses. In certain implementations, each of the radar devices secured underneath the lenses may be directed and/or aimed toward the user's mouth. For example, each transmitter element of the radar devices may target the corners of the user's mouth, the user's upper lip, and/or the user's lower lip.

In one example, the frame and/or front frame of the smart glasses may be equipped with one or more radar devices directed and/or aimed toward the user's eyes, eyelids, eyebrows, and/or forehead. For example, each transmitter element of the radar devices may target one or more facial features whose movement, position, and/or shape is relevant and/or significant to an avatar of the user. In this example, at least one of the radar devices may be positioned and/or located on the frame, front frame, bridge, lenses, and/or rims of the smart glasses. Additionally or alternatively, at least one of the radar devices may be positioned and/or located on the temples, arms, and/or hinges of the smart glasses.

In some examples, the smart glasses may include and/or represent one or more processing devices that are communicatively coupled to the radar devices. In one example, the one or more processing devices may obtain, collect, and/or gather data captured by the radar devices. In this example, the one or more processing devices may analyze and/or process the data to detect facial expressions and/or track facial movement of users. In certain implementations, the processing devices may map and/or apply the facial expressions and/or movements to avatars of the users.

In some examples, the radar devices may be synchronized with one another via a common clock signal. For example, the radar devices may all operate and/or run on the same clock signal. Additionally or alternatively, the radar devices may be synchronized with one another via signal strength measurements. For example, the radar devices may be calibrated to compensate and/or account for certain differences and/or deficiencies.

In some examples, the transceiver elements of the radar devices may operate simultaneously and/or be activated sequentially. For example, the transceiver elements of the radar devices may be cycled to emit and/or transmit signals sequentially and/or consecutively, thereby enabling the radar and/or processing devices to determine which transceiver elements are activated at any given time. Additionally or alternatively, the transceiver elements of the radar devices may operate and/or run simultaneously on different phases, thereby enabling the radar and/or processing devices to distinguish between the various signals transmitted by those transceiver elements.

In some examples, the radar devices may be able to leverage signals transmitted by remote transmitter elements. For example, a radar device secured under one of the lenses incorporated in a pair of smart glasses may transmit a signal toward the bottom lip of a user. In this example, the signal may bounce and/or be reflect off the bottom lip of the user and then travel toward another radar device secured under another one of the lenses in the pair of smart glasses. The other radar device may obtain, receive, and/or detect the signal that bounced and/or was reflected off the bottom lip of the user. This other radar device and/or one or more processing devices may then analyze and/or process the signal for the purpose of sensing users' facial expressions.

The following will provide, with reference to FIGS. 1-8, detailed descriptions of exemplary apparatuses, devices, systems, components, and corresponding configurations or implementations for sensing facial expressions for avatar animation. In addition, detailed descriptions of methods for sensing facial expressions for avatar animation will be provided in connection with FIG. 9. The discussion corresponding to FIGS. 10 and 11 will provide detailed descriptions of types of exemplary artificial-reality devices, wearables, and/or associated systems capable of sensing facial expressions for avatar animation.

FIG. 1 illustrates an exemplary apparatus 100 for sensing facial expressions for avatar animation. As illustrated in FIG. 1, apparatus 100 may include and/or represent an eyewear frame 102 dimensioned to be worn by a user. In some examples, eyewear frame 102 may include and/or be equipped with radar devices 104(1)-(N), circuitry 106, and/or an output device 110. In one example, radar devices 104(1)-(N) may be coupled and/or secured to eyewear frame 102. In this example, radar devices 104(1)-(N) may each be configured and/or arranged to transmit a signal toward a facial feature of the user and/or to receive the signal from the facial feature. Accordingly, the signal may bounce off and/or be reflected by the facial feature back toward one of radar devices 104(1)-(N).

In some examples, radar devices 104(1)-(N) may include and/or implement millimeter-wave (mmWave) radar technology and/or Frequency-Modulated Continuous-Wave (FMCW) technology. Examples of radar devices 104(1)-(N) include, without limitation, mmWave radar devices, FMCW radar devices, sinusoidal-wave radar devices, sawtooth-wave radar devices, triangle-wave radar devices, square-wave radar devices, pulse radar devices, variations or combinations of one or more of the same, and/or any other suitable radar devices.

In some examples, radar devices 104(1)-(N) may transmit frequency-modulated radar signals to facial features of the user. Additionally or alternatively, radar devices 104(1)-(N) may each receive and/or detect frequency-modulated radar signals returned from and/or reflected by such facial features.

In some examples, apparatus 100 may include and/or represent an HMD. In one example, the term "head-mounted display" and/or the abbreviation "HMD" may refer to any type or form of display device or system that is worn on or about a user's face and displays virtual content, such as computer-generated objects and/or AR content, to the user. HMDs may present and/or display content in any suitable way, including via a display screen, a liquid crystal display (LCD), a light-emitting diode (LED), a microLED display, a plasma display, a projector, a cathode ray tube, an optical mixer, combinations or variations of one or more of the same, and/or any other suitable HMDs. HMDs may present and/or display content in one or more media formats. For example, HMDs may display video, photos, computer-generated imagery (CGI), and/or variations or combinations of one or more of the same. Additionally or alternatively, HMDs may include and/or incorporate see-through lenses that enable the user to see the user's surroundings in addition to such computer-generated content.

HMDs may provide diverse and distinctive user experiences. Some HMDs may provide virtual reality experiences (i.e., they may display computer-generated or pre-recorded content), while other HMDs may provide real-world experiences (i.e., they may display live imagery from the physical world). HMDs may also provide any mixture of live and virtual content. For example, virtual content may be projected onto the physical world (e.g., via optical or video see-through lenses), which may result in AR and/or mixed reality experiences.

In some examples, circuitry 106 may include and/or represent one or more electrical and/or electronic circuits capable of processing, applying, modifying, transforming, displaying, transmitting, receiving, and/or executing data for apparatus 100. In one example, circuitry 106 may process the signals received by radar devices 104(1)-(N) and/or detect one or more facial expressions or movements of the user based at least in part on the signals. In this example, circuitry 106 may animate an avatar of the user based at least in part on the one or more facial expressions. Additionally or alternatively, circuitry 106 may provide the avatar of the user for presentation on a display device such that the animation of the avatar is visible to the user via the display device.

In some examples, circuitry 106 may launch, perform, and/or execute certain executable files, code snippets, and/or computer-readable instructions to facilitate and/or support sensing facial expressions for avatar animation. Although illustrated as a single unit in FIG. 1, circuitry 106 may include and/or represent a collection of multiple processing units and/or electrical or electronic components that work and/or operate in conjunction with one another. In one example, circuitry 106 may include and/or represent an application-specific integrated circuit (ASIC). In another example, circuitry 106 may include and/or represent a central processing unit (CPU). Examples of circuitry 106 include, without limitation, processing devices, microprocessors, microcontrollers, graphics processing units (GPUs), field-programmable gate arrays (FPGAs), systems on chips (SoCs), parallel accelerated processors, tensor cores, integrated circuits, chiplets, optical modules, receivers, transmitters, transceivers, optical modules, portions of one or more of the same, variations or combinations of one or more of the same, and/or any other suitable circuitry.

In some examples, circuitry 106 and/or another processing device may provide, output, and/or deliver the avatar and/or the corresponding animation to output device 110 for display to the user and/or for transmission to a remote computing device. In such examples, output device 110 may be configured and/or programmed to facilitate and/or support the presentation and/or transmission of animated avatars. In one example, output device 110 may include and/or represent a processing device responsible for providing animated avatars for presentation to the users on a display. In another example, output device 110 may include and/or represent a display and/or screen on which avatars are presented to the users. Additionally or alternatively, output device 110 may include and/or represent a transmitter and/or transceiver that transmits data representative of animated avatars to remote devices (e.g., in connection with a teleconferencing, AR, and/or VR application).

In some examples, output device 110 may be configured and/or programmed to facilitate and/or support the presentation, transmission, and/or animation of avatars. In one example, output device 110 may include and/or represent a processing device responsible for providing avatars for presentation to the users on a display. In another example, output device 110 may include and/or represent a display, screen, and/or monitor on which avatars are presented to and/or animated for the users. Additionally or alternatively, output device 110 may include and/or represent a transmitter and/or transceiver that transmits data representative of avatars to remote devices (e.g., in connection with a teleconferencing, AR, and/or VR application).

In some examples, eyewear frame 102 may include and/or represent any type or form of structure and/or assembly capable of securing and/or mounting radar devices 104(1)-(N) to the user's head or face. In one example, eyewear frame 102 may be sized, dimensioned, and/or shaped in any suitable way to facilitate securing and/or mounting an artificial-reality device to the user's head or face. In one example, eyewear frame 102 may include and/or contain a variety of different materials. Additional examples of such materials include, without limitation, plastics, acrylics, polyesters, metals (e.g., aluminum, magnesium, etc.), nylons, conductive materials, rubbers, neoprene, carbon fibers, composites, combinations or variations of one or more of the same, and/or any other suitable materials.

In some examples, radar devices 104(1)-(N) may be synchronized with one another via a common clock signal. For example, radar devices 104(1)-(N) may all operate and/or run on the same clock signal. Additionally or alternatively, circuitry 106 may synchronize radar devices 104(1)-(N) with one another via signal strength measurements. For example, circuitry 106 may take distance and/or ranging measurements with radar devices 104(1)-(N). In this example, circuitry 106 may synchronize radar devices 104(1)-(N) with one another based at least in part on those distance and/or ranging measurements. Additionally or alternatively, circuitry 106 may calibrate radar devices 104(1)-(N) to compensate and/or account for certain differences among those distance and/or ranging measurements.

Figure 2:
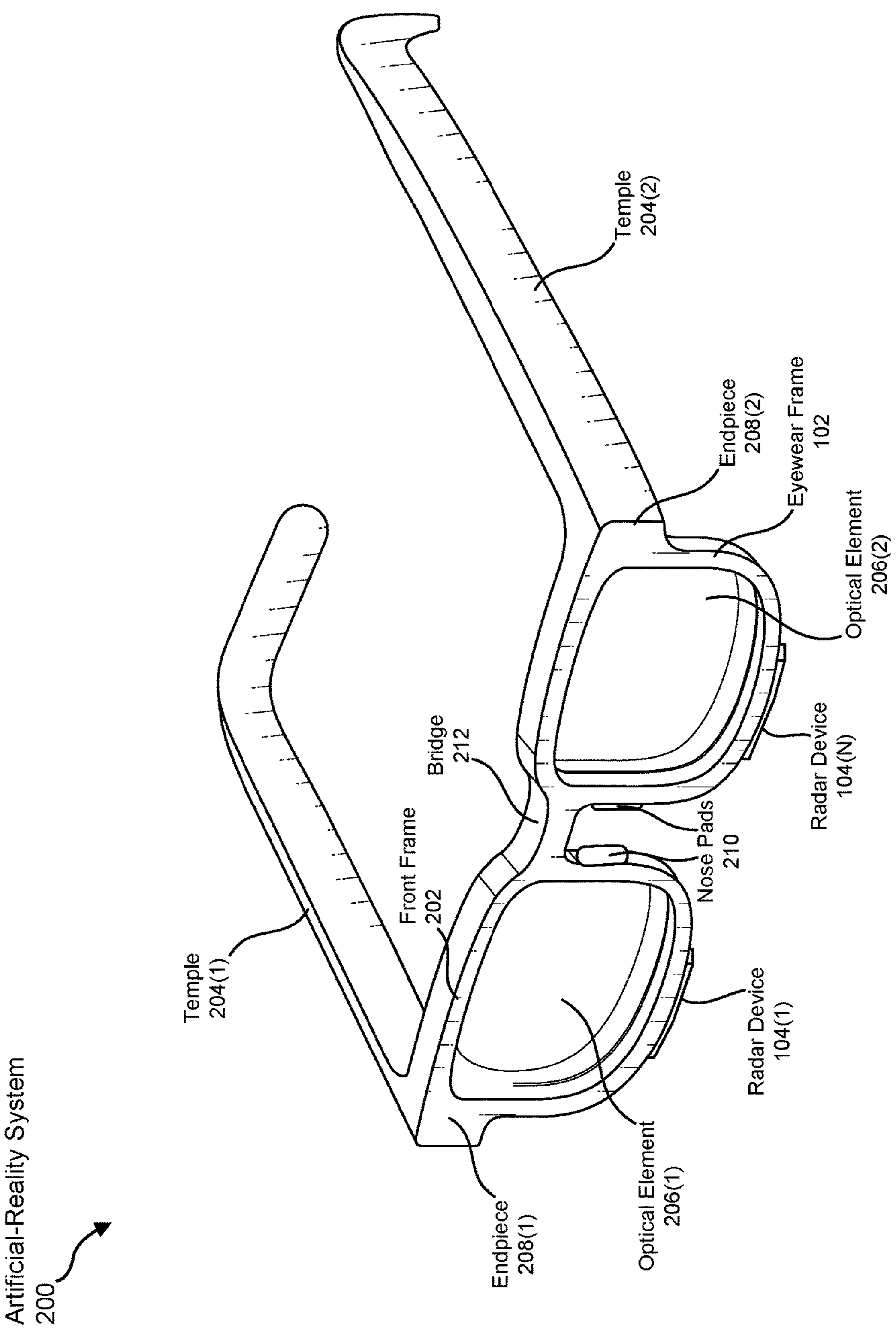
FIG. 2 is an illustration of an exemplary artificial-reality system for sensing facial expressions for avatar animation according to one or more implementations of this disclosure.
Figure 3:
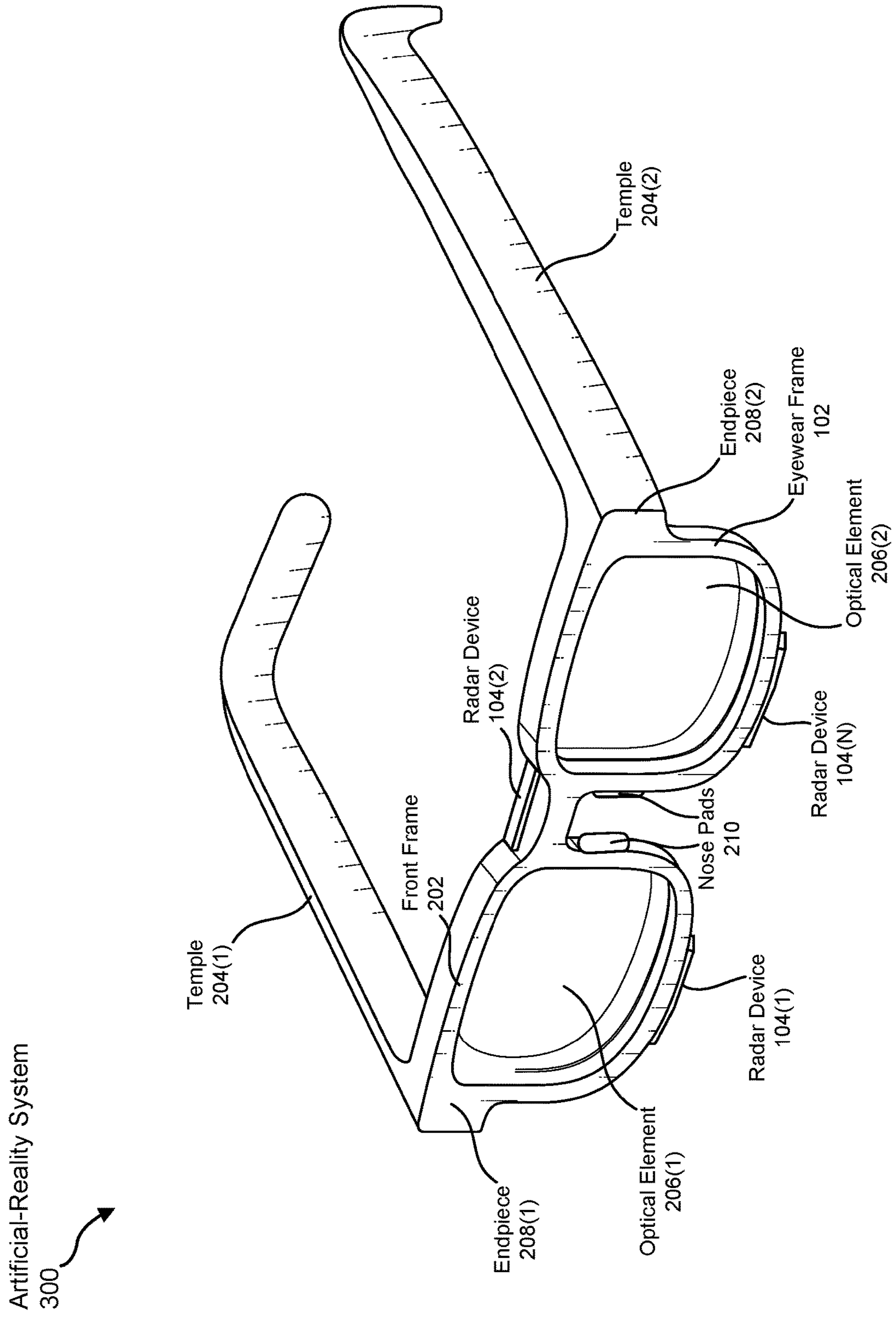
FIG. 3 is an illustration of an exemplary artificial-reality system for sensing facial expressions for avatar animation according to one or more implementations of this disclosure.

FIGS. 2 and 3 illustrate exemplary artificial-reality systems 200 and 300, respectively, that facilitates and/or supports sensing facial expressions for avatar animation. In some examples, artificial-reality systems 200 and 300 may include and/or represent certain components and/or features that perform and/or provide functionalities that are similar and/or identical to those described above in connection with FIG. 1. As illustrated in FIG. 2, artificial-reality system 200 may include and/or represent radar devices 104(1)-(N) coupled, fixed, and/or secured to eyewear frame 102. In one example, eyewear frame 102 may include and/or represent a front frame 202, temples 204(1) and 204(2), optical elements 206(1) and 206(2), endpieces 208(1) and 208(2), nose pads 210, and/or a bridge 212.

In some examples, optical elements 206(1) and 206(2) may be inserted and/or installed in front frame 202. In other words, optical elements 206(1) and 206(2) may be coupled to, incorporated in, and/or held by eyewear frame 102. In one example, optical elements 206(1) and 206(2) may be configured and/or arranged to provide one or more virtual features for presentation to a user wearing artificial-reality system 200. These virtual features may be driven, influenced, and/or controlled by one or more wireless technologies supported by artificial-reality system 200 and/or by radar devices 104(1)-(N).

In some examples, optical elements 206(1) and 206(2) may each include and/or represent optical stacks, lenses, and/or films. In one example, optical elements 206(1) and 206(2) may each include and/or represent various layers that facilitate and/or support the presentation of virtual features and/or elements that overlay real-world features and/or elements. Additionally or alternatively, optical elements 206(1) and 206(2) may each include and/or represent one or more screens, lenses, and/or fully or partially see-through components. Examples of optical elements 206(1) and (2) include, without limitation, electrochromic layers, dimming stacks, transparent conductive layers (such as indium tin oxide films), metal meshes, antennas, transparent resin layers, lenses, films, combinations or variations of one or more of the same, and/or any other suitable optical elements.

In some examples, radar devices 104(1)-(N) may be coupled and/or secured to front frame 202 underneath and/or below optical elements 206(1)-(2), respectively. As illustrated in FIG. 3, artificial-reality system 300 may include and/or represent radar devices 104(1), 104(2), and 104(N) coupled, fixed, and/or secured to eyewear frame 102. For example, radar devices 104(1) and 104(N) may be coupled and/or secured to front frame 202 underneath and/or below optical elements 206(1) and 206(2), respectively. In this example, radar device 104(2) may be coupled and/or secured to bridge 212 of eyewear frame 102.

Figure 4:
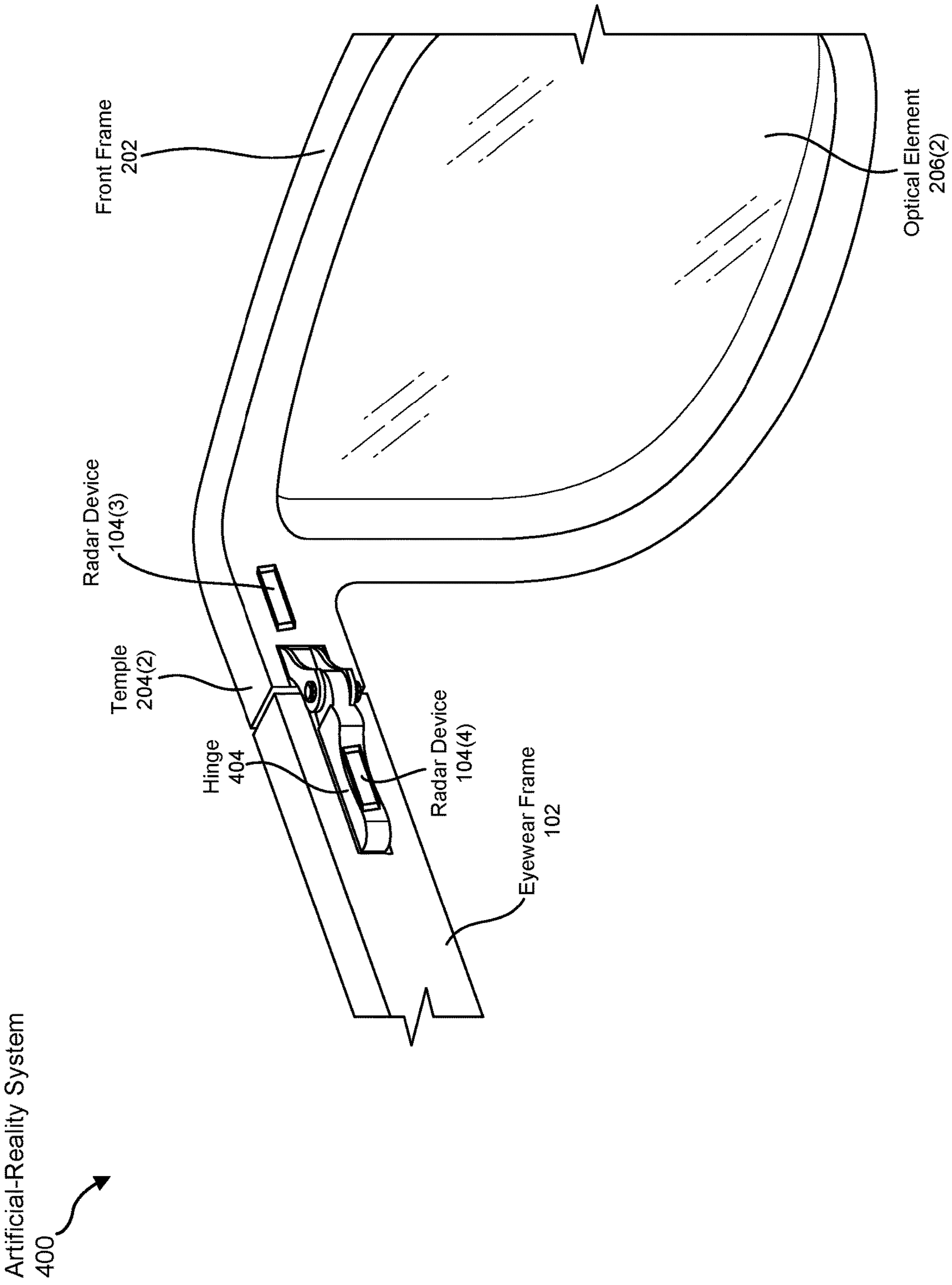
FIG. 4 is an illustration of an exemplary artificial-reality system for sensing facial expressions for avatar animation according to one or more implementations of this disclosure.

FIG. 4 illustrates an exemplary artificial-reality system 400 that facilitates and/or supports sensing facial expressions for avatar animation. In some examples, artificial-reality system 400 may include and/or represent certain components and/or features that perform and/or provide functionalities that are similar and/or identical to those described above in connection with any of FIGS. 1-3. As illustrated in FIG. 4, artificial-reality system 400 may include and/or represent radar devices 104(3) and 104(4) coupled, fixed, and/or secured to eyewear frame 102. In one example, radar device 104(3) may be coupled and/or secured to eyepiece 208(2) of eyewear frame 102. Additionally or alternatively, radar device 104(4) may be coupled and/or secured to a hinge 404 of eyewear frame 102. In certain implementations, radar devices 104(3) and 104(4) may each be directed and/or aimed to transmit a signal toward a facial feature of the user and/or to receive the signal from the facial feature of the user.

Figure 5:
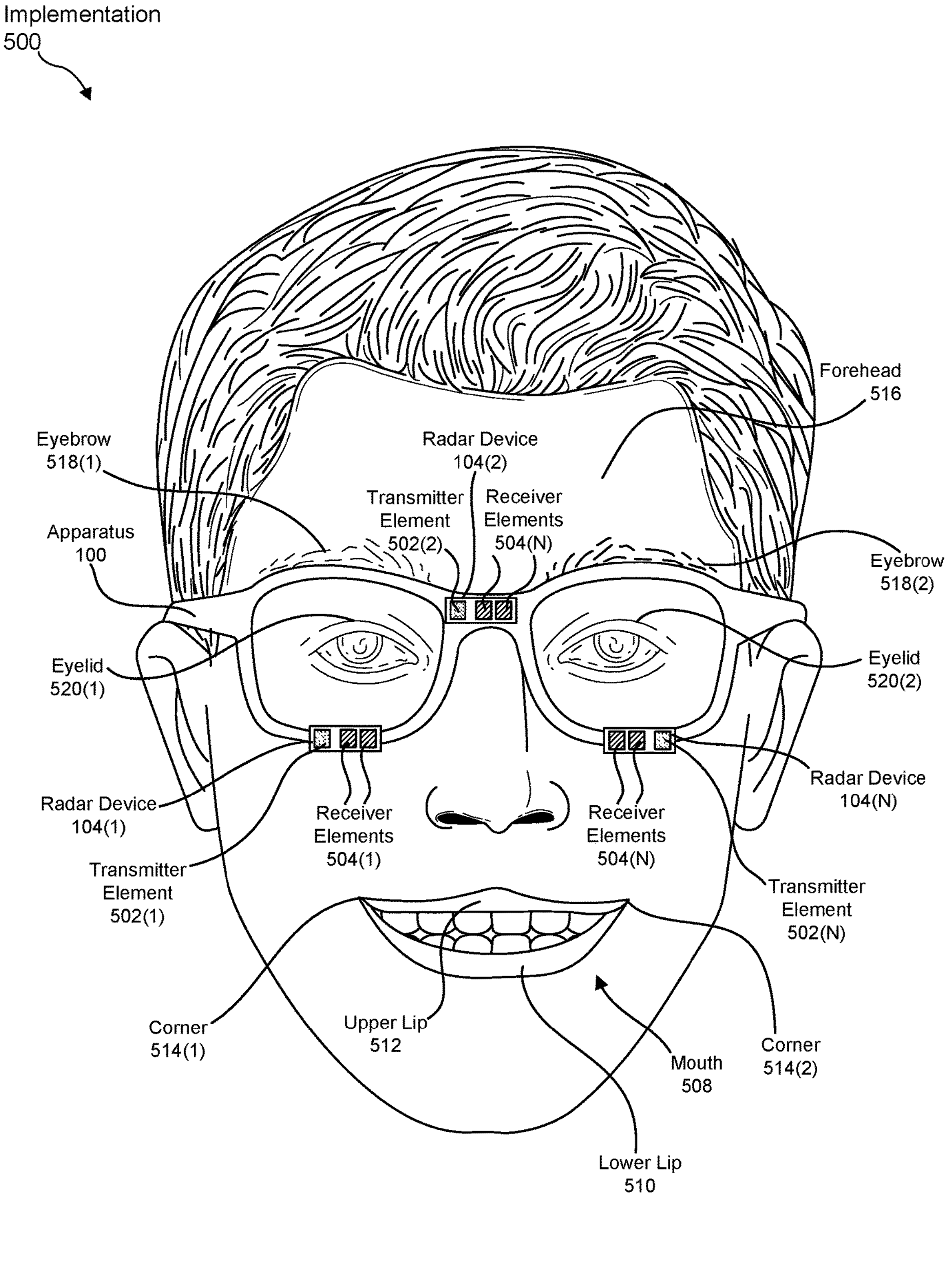
FIG. 5 is an illustration of an exemplary implementation for sensing facial expressions for avatar animation according to one or more implementations of this disclosure.
Figure 6:
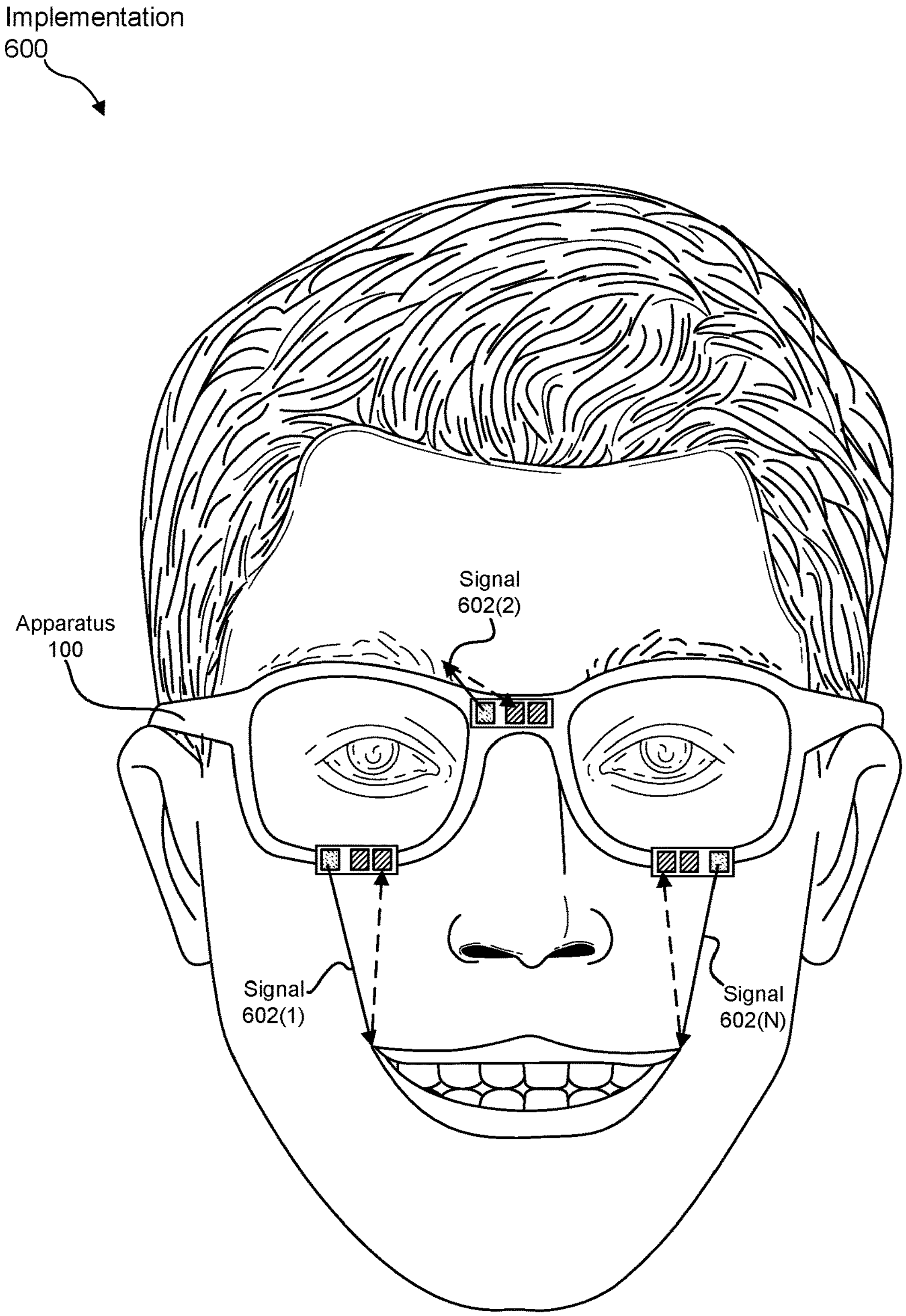
FIG. 6 is an illustration of an exemplary implementation for sensing facial expressions for avatar animation according to one or more implementations of this disclosure.
Figure 7:
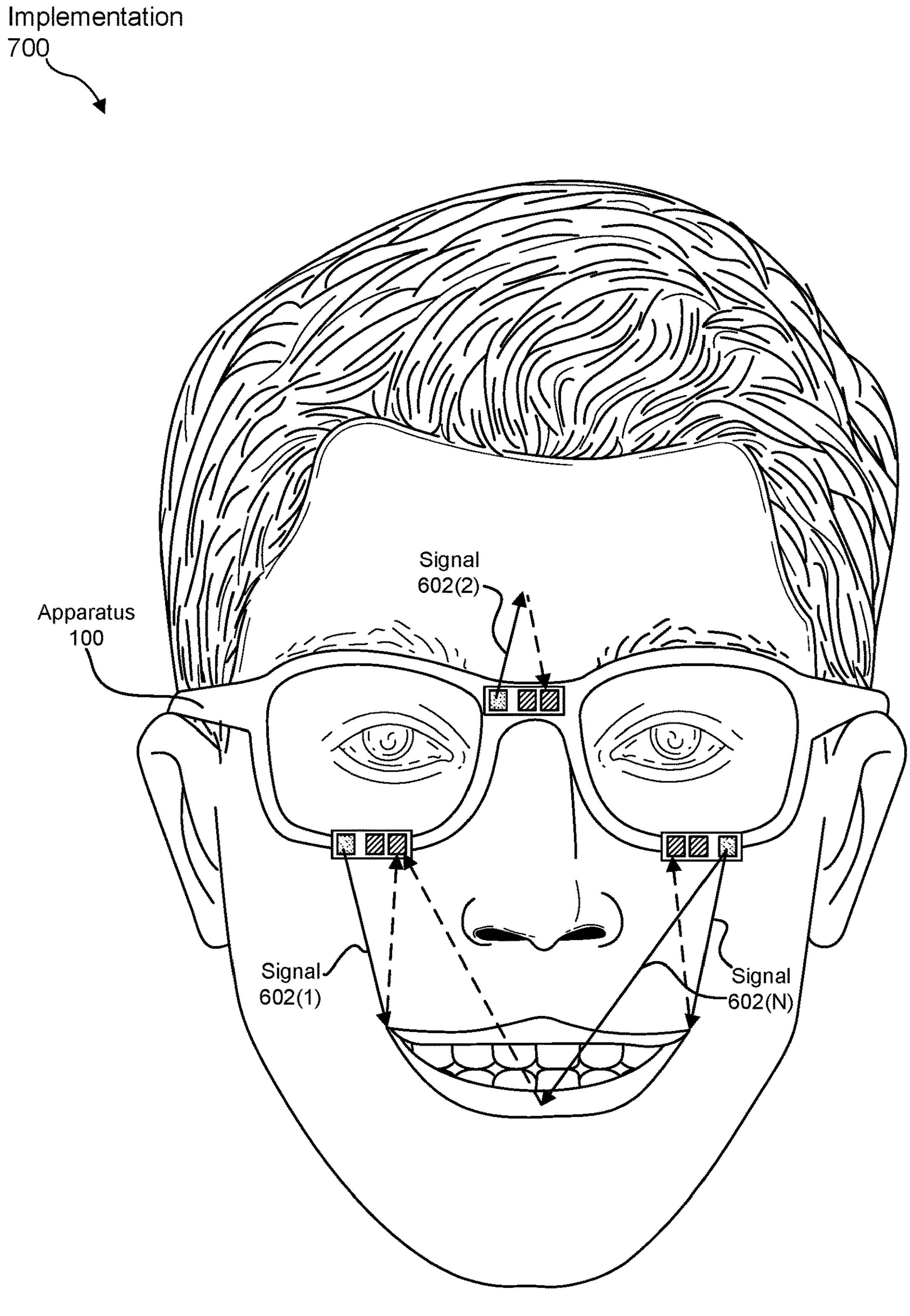
FIG. 7 is an illustration of an exemplary implementation for sensing facial expressions for avatar animation according to one or more implementations of this disclosure.

FIGS. 5-7 illustrate exemplary implementations 500, 600, and 700 of apparatus 100. In some examples, implementations 500, 600, and 700 may include and/or represent certain components and/or features that perform and/or provide functionalities that are similar and/or identical to those described above in connection with any of FIGS. 1-4. As illustrated in FIGS. 5-7, implementations 500, 600, and 700 may each involve and/or represent apparatus 100 worn and/or donned by a user. In implementations 500, 600, and 700, apparatus 100 may include and/or represent radar devices 104(1), 104(2), and 104(N) coupled, fixed, and/or secured to eyewear frame 102.

In some examples, radar devices 104(1), 104(2), and 104(N) may include and/or represent transmitter elements 502(1), 502(2), and 502(N), respectively. Additionally or alternatively, radar devices 104(1), 104(2), and 104(N) may include and/or represent receiver elements 504(1), 504(2), and 504(N), respectively. In one example, radar devices 104(1), 104(2), and 104(N) may each include and/or represent multiple receiver elements configured and/or arranged to receive and/or detect signals emitted by transmitter elements 502(1), 502(2), and 502(N), respectively.

In some examples, radar devices 104(1), 104(2), and 104(N) may each be directed and/or aimed to transmit a signal toward a facial feature of the user and/or to receive the signal from the facial feature of the user. As illustrated in FIG. 5, the user's facial features may include and/or represent a mouth 508, a lower lip 510, an upper lip 512, corners 514(1) and 514(2) of mouth 508, a forehead 516, eyebrows 518(1) and 518(2), and/or eyelids 520(1) and 520(2). In one example, such facial features may be meaningful and/or relevant to animating an avatar of the user. Accordingly, radar devices 104(1), 104(2), and/or 104(N) may be configured and/or arranged to collect information and/or data used to determine and/or detect certain facial expressions and/or movements of the user based at least in part on such facial features.

As illustrated in FIGS. 6, implementation 600 may involve and/or represent signals 602(1), 602(2), and 602(N) being emitted and/or transmitted by radar devices 104(1), 104(2), and 104(N), respectively. In some examples, signal 602(1) may traverse and/or travel from radar device 104(1) to corner 514(1) of the user's mouth. In one example, signal 602(1) may bounce off and/or be reflected by corner 514(1) of the user's mouth back toward radar device 104(1). In this example, signal 602(1) may then be received, obtained, and/or detected by radar device 104(1).

In some examples, signal 602(N) may traverse and/or travel from radar device 104(N) to corner 514(2) of the user's mouth. In one example, signal 602(N) may bounce off and/or be reflected by corner 514(2) of the user's mouth back toward radar device 104(N). In this example, signal 602(N) may then be received, obtained, and/or detected by radar device 104(N).

In some examples, signal 602(2) may traverse and/or travel from radar device 104(2) to eyebrow 518(1) of the user. In one example, signal 602(2) may bounce off and/or be reflected by eyebrow 518(1) back toward radar device 104(2). In this example, signal 602(2) may then be received, obtained, and/or detected by radar device 104(2).

As illustrated in FIG. 7, implementation 700 may involve and/or represent signals 602(1), 602(2), and 602(N) being emitted and/or transmitted by radar devices 104(1), 104(2), and 104(N), respectively. In some examples, one or more of radar devices 104(1), 104(2), and 104(N) may receive, obtain, and/or detect signals that were transmitted by one another. In other words, one radar device may receive, obtain, and/or detect a signal that was transmitted by another radar device. For example, at least a portion of signal 602(N) may traverse and/or travel from radar device 104(N) to lower lip 510 of the user's mouth. In one example, this portion of signal 602(N) may bounce off and/or be reflected by lower lip 510 of the user's mouth toward radar device 104(1), as opposed to radar device 104(N). In this example, the portion of signal 602(N) may then be received, obtained, and/or detected by radar device 104(1).

As further illustrated in FIG. 7, signal 602(2) may traverse and/or travel from radar device 104(2) to forehead 516 of the user. In one example, signal 602(2) may bounce off and/or be reflected by forehead 516 back toward radar device 104(2). In this example, signal 602(2) may then be received, obtained, and/or detected by radar device 104(2).

Figure 8:
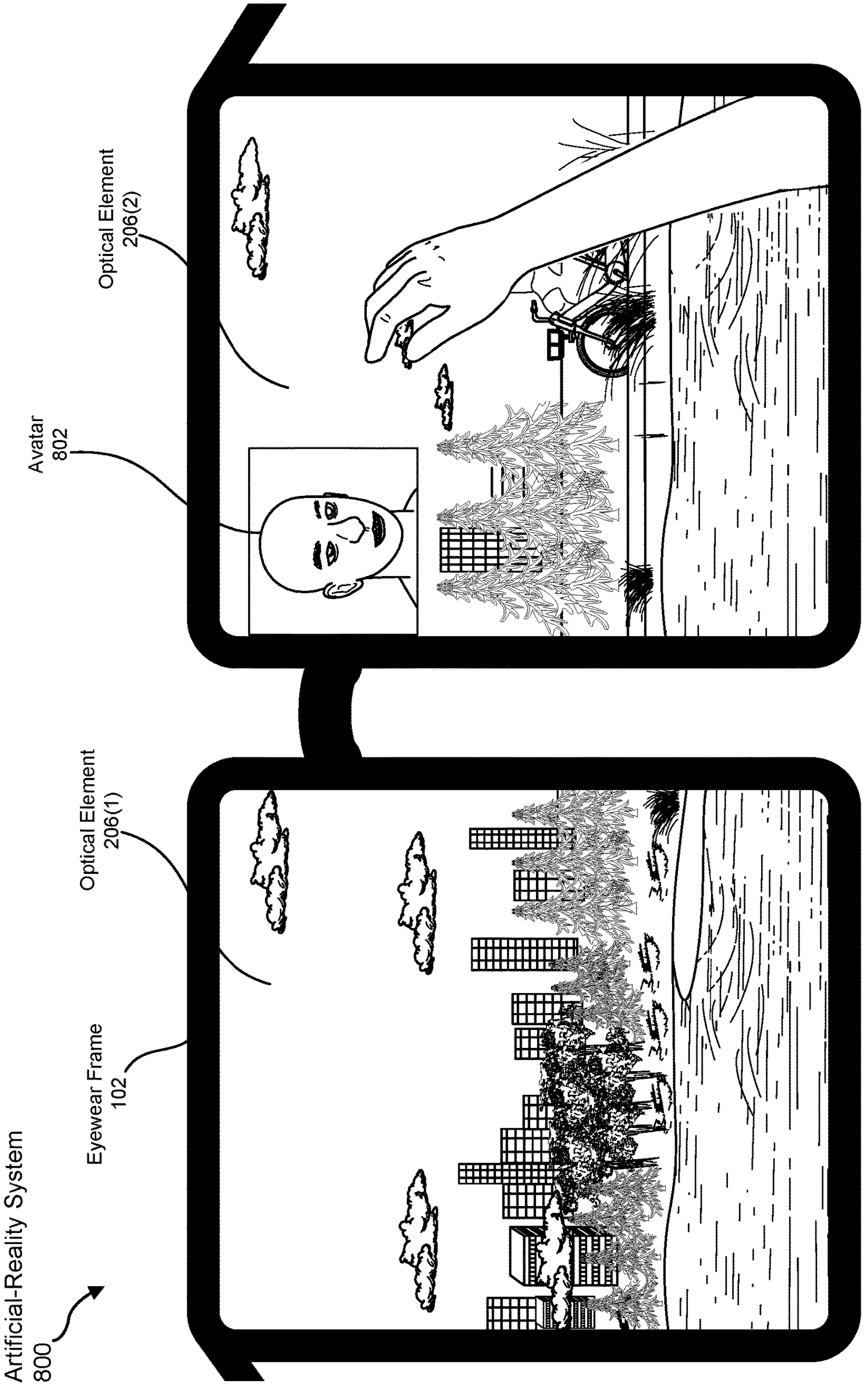
FIG. 8 is an illustration of an exemplary artificial-reality system capable of presenting an avatar of a user for display according to one or more implementations of this disclosure.

FIG. 8 illustrates an exemplary artificial-reality system 800 that facilitates and/or supports sensing facial expressions for avatar animation. In some examples, artificial-reality system 800 may include and/or represent certain components and/or features that perform and/or provide functionalities that are similar and/or identical to those described above in connection with any of FIGS. 1-7. As illustrated in FIG. 8, artificial-reality system 800 may include and/or represent a see-through display integrated into eyewear frame 102 worn and/or donned by a user. In some examples, the see-through display may include and/or represent optical elements 206(1) and 206(2) that enable the user to see the user's surroundings as well as certain virtual elements in an AR experience.

In some examples, circuitry 106 may generate, render, and/or produce an avatar 802 based at least in part on information, data, and/or measurements received, obtained, or detected by radar devices 104(1)-(N). In one example, avatar 802 may include and/or contain a three-dimensional (3D) representation and/or depiction of the head and/or face of the user wearing and/or donning eyewear frame 102. In another example, avatar 802 may include and/or contain a 3D representation and/or depiction of the head and/or face of another user in communication with the user wearing and/or donning eyewear frame 102. In certain implementations, the other user may be wearing and/or donning another instance of apparatus 100 and/or eyewear frame 102.

In some examples, circuitry 106 may provide avatar 802 for presentation and/or display on one or more of optical elements 206(1) and 206(2). Additionally or alternatively, circuitry 106 may cause avatar 802 to be provided for presentation and/or display on the other instance of apparatus 100 and/or eyewear frame 102 worn and/or donned by the other user.

In some examples, circuitry 106 may animate, modify, and/or control avatar 802 to coincide with and/or correspond to one or more facial expressions and/or movements of the user and/or other user. In one example, circuitry 106 may discern and/or detect these facial expressions and/or movements based at least in part on the information, data, and/or measurements received, obtained, or detected by radar devices 104(1)-(N). For example, circuitry 106 may animate avatar 802 based at least in part on such information, data, and/or measurements. In this example, the animation may cause avatar 802 to follow and/or track the facial expressions and/or movements made by mouth 508, lower lip 510, upper lip 512, corners 514(1) and 514(2) of mouth 508, forehead 516, eyebrows 518(1) and 518(2), and/or eyelids 520(1) and 520(2).

In some examples, the various apparatuses, devices, and systems described in connection with FIGS. 1-8 may include and/or represent one or more additional circuits, components, and/or features that are not necessarily illustrated and/or labeled in FIGS. 1-8. For example, the apparatuses, devices, and systems illustrated in FIGS. 1-8 may also include and/or represent additional analog and/or digital circuitry, onboard logic, transistors, RF transmitters, RF receivers, transceivers, antennas, resistors, capacitors, diodes, inductors, switches, registers, flipflops, digital logic, connections, traces, buses, semiconductor (e.g., silicon) devices and/or structures, processing devices, storage devices, circuit boards, sensors, packages, substrates, housings, combinations or variations of one or more of the same, and/or any other suitable components. In certain implementations, one or more of these additional circuits, components, and/or features may be inserted and/or applied between any of the existing circuits, components, and/or features illustrated in FIGS. 1-8 consistent with the aims and/or objectives described herein. Accordingly, the couplings and/or connections described with reference to FIGS. 1-8 may be direct connections with no intermediate components, devices, and/or nodes or indirect connections with one or more intermediate components, devices, and/or nodes.

In some examples, the phrase "to couple" and/or the term "coupling", as used herein, may refer to a direct connection and/or an indirect connection. For example, a direct coupling between two components may constitute and/or represent a coupling in which those two components are directly connected to each other by a single node that provides continuity from one of those two components to the other. In other words, the direct coupling may exclude and/or omit any additional components between those two components.

Additionally or alternatively, an indirect coupling between two components may constitute and/or represent a coupling in which those two components are indirectly connected to each other by multiple nodes that fail to provide continuity from one of those two components to the other. In other words, the indirect coupling may include and/or incorporate at least one additional component between those two components.

Figure 9:
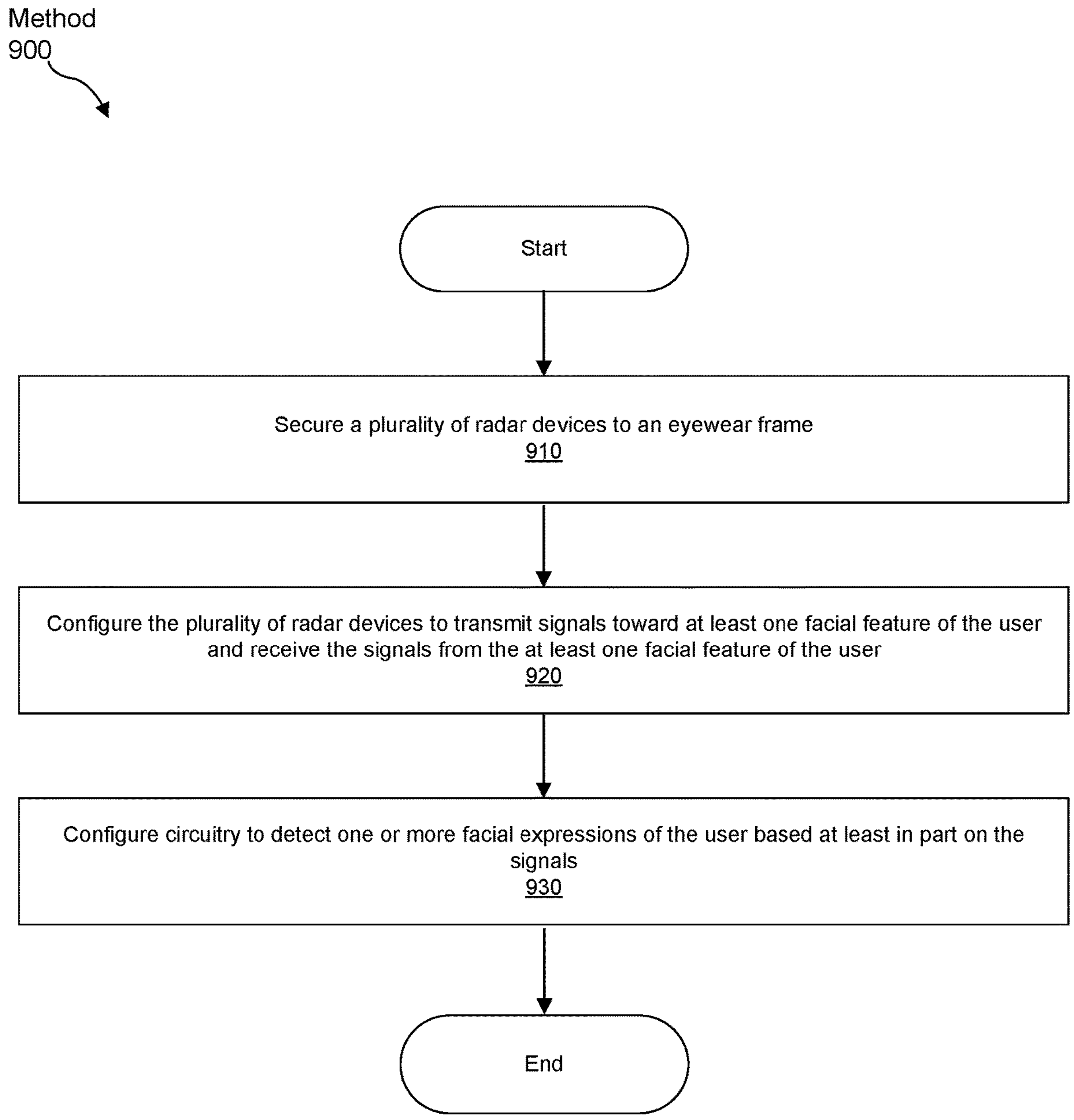
FIG. 9 is a flow diagram of an exemplary method for sensing facial expressions for avatar animation according to one or more implementations of this disclosure.

FIG. 9 is a flow diagram of an exemplary method 900 for configuring, assembling, and/or programming apparatuses, devices, or systems capable of sensing facial expressions for avatar animation. In one example, the steps shown in FIG. 9 may be achieved and/or accomplished by a computing equipment manufacturer or subcontractor that manufactures and/or produces HMDs for AR experiences. Additionally or alternatively, the steps shown in FIG. 9 may incorporate and/or involve certain sub-steps and/or variations consistent with the descriptions provided above in connection with FIGS. 1-8.

As illustrated in FIG. 9, method 900 may include the step of securing a plurality of radar devices to an eyewear frame (910). Step 910 may be performed in a variety of ways, including any of those described above in connection with FIGS. 1-8. For example, an AR equipment manufacturer or subcontractor may couple, fix, and/or secure a plurality of radar devices to an eyewear frame.

Method 900 may also include the step of configuring the plurality of radar devices to transmit signals toward at least one facial feature of the user and receive the signals from the at least one facial feature of the user (920). Step 920 may be performed in a variety of ways, including any of those described above in connection with FIGS. 1-8. For example, the AR equipment manufacturer or subcontractor may configure and/or program the plurality of radar devices to transmit signals toward at least one facial feature of the user and receive the signals from the at least one facial feature of the user.

Method 900 may further include the step of configuring circuitry to detect one or more facial expressions of the user based at least in part on the signals (930). Step 930 may be performed in a variety of ways, including any of those described above in connection with FIGS. 1-8. For example, the AR equipment manufacturer or subcontractor may configure and/or program circuitry to detect one or more facial expressions of the user based at least in part on the signals.

EXAMPLE EMBODIMENTS

Example 1: An apparatus comprising (1) an eyewear frame dimensioned to be worn by a user and (2) a plurality of radar devices secured to the eyewear frame, wherein the plurality of radar devices are each configured to (A) transmit a signal toward a facial feature of the user and (B) receive the signal from the facial feature of the user.

Example 2: The apparatus of Example 1, further comprising circuitry configured to (1) process the signals received by the plurality of radar devices and (2) detect one or more facial expressions of the user based at least in part on the signals.

Example 3: The apparatus of either Example 1 or Example 2, wherein the circuitry is configured to animate an avatar of the user based at least in part on the one or more facial expressions.

Example 4: The apparatus of any of Examples 1-3, wherein the circuitry is configured to provide the avatar of the user for presentation on a display device such that the animation of the avatar is visible on the display device.

Example 5: The apparatus of any of Examples 1-4, wherein the plurality of radar devices comprise (1) a first radar device that transmits a first signal toward a facial feature of the user and/or (2) a second radar device that receives the first signal after having bounced off the facial feature of the user.

Example 6: The apparatus of any of Examples 1-5, wherein the plurality of radar devices are synchronized with one another via at least one of (1) a common clock signal and/or (2) one or more signal strength measurements.

Example 7: The apparatus of any of Examples 1-6, wherein (1) the eyewear frame comprises a front frame and a pair of optical elements installed in the front frame and (2) the plurality of radar devices are secured to the front frame underneath the pair of optical elements.

Example 8: The apparatus of any of Examples 1-7, wherein the plurality of radar devices each comprise a transmitter element configured to aim toward a mouth of the user.

Example 9: The apparatus of any of Examples 1-8, further comprising at least one additional radar device secured to a bridge of the eyewear frame.

Example 10: The apparatus of any of Examples 1-9, wherein at least one of the plurality of radar devices is secured to a temple of the eyewear frame.

Example 11: The apparatus of any of Examples 1-10, wherein at least one of the plurality of radar devices is secured to a hinge of the eyewear frame.

Example 12: The apparatus of any of Examples 1-11, wherein the plurality of radar devices comprise a set of millimeter-wave radar devices.

Example 13: The apparatus of any of Examples 1-12, wherein the facial feature toward which the signal is transmitted comprises at least one of a mouth of the user, a lip of the user, an eyebrow of the user, an eyelid of the user, a corner of the mouth of the user, and/or a forehead of the user.

Example 14: An artificial-reality system comprising (1) an eyewear frame dimensioned to be worn by a user, (2) a plurality of radar devices secured to the eyewear frame, wherein the plurality of radar devices are each configured to (A) transmit a signal toward a facial feature of the user and (B) receive the signal from the facial feature of the user, and (3) an output device configured to facilitate presentation of an avatar of the user.

Example 15: The artificial-reality system of Example 14, further comprising circuitry configured to (1) process the signals received by the plurality of radar devices and (2) detect one or more facial expressions of the user based at least in part on the signals.

Example 16: The artificial-reality system of Example 14 or Example 15, wherein the circuitry is configured to animate an avatar of the user based at least in part on the one or more facial expressions.

Example 17: The artificial-reality system of any of Examples 14-16, wherein the circuitry is configured to provide the avatar of the user for presentation on a output device such that the animation of the avatar is visible on the output device.

Example 18: The artificial-reality system of any of Examples 14-17, wherein the plurality of radar devices comprise (1) a first radar device that transmits a first signal toward a facial feature of the user and/or (2) a second radar device that receives the first signal after having bounced off the facial feature of the user.

Example 19: The artificial-reality system of any of Examples 14-18, wherein the plurality of radar devices are synchronized with one another via at least one of (1) a common clock signal and/or (2) one or more signal strength measurements.

Example 20: A method comprising (1) securing a plurality of radar devices to an eyewear frame, (2) configuring the plurality of radar devices to transmit signals toward at least one facial feature of a user and receive the signals from the at least one facial feature of the user, and (3) configuring circuitry to detect one or more facial expressions of the user based at least in part on the signals.

Embodiments of the present disclosure may include or be implemented in conjunction with various types of artificial-reality systems. Artificial reality is a form of reality that has been adjusted in some manner before presentation to a user, which may include, for example, a VR, an AR, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a 3D effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1000 in FIG. 10) or that visually immerses a user in an artificial reality (such as, e.g., virtual-reality system 1100 in FIG. 11). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 10:
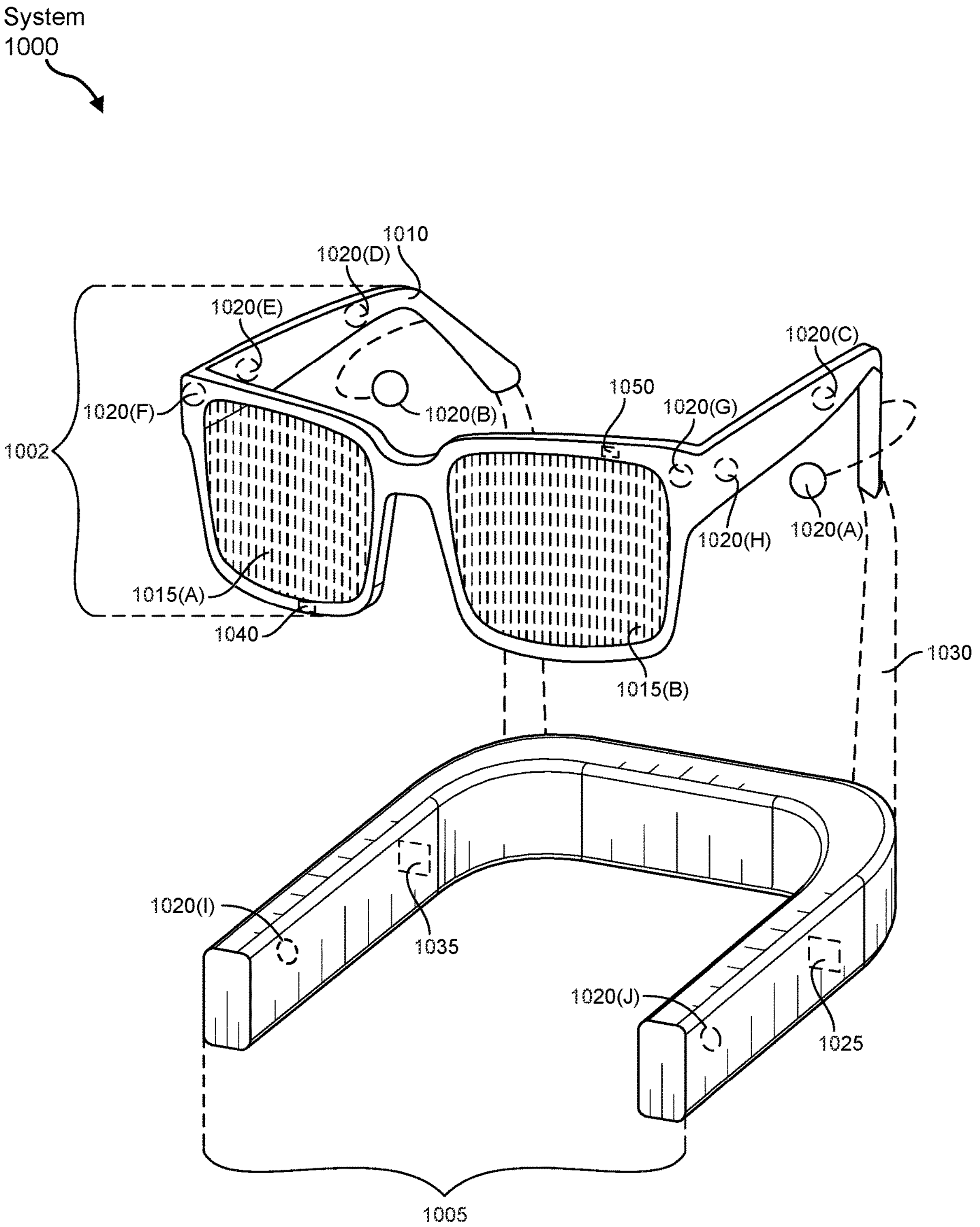
FIG. 10 is an illustration of exemplary augmented-reality glasses that may be used in connection with one or more implementations of this disclosure.
Figure 11:
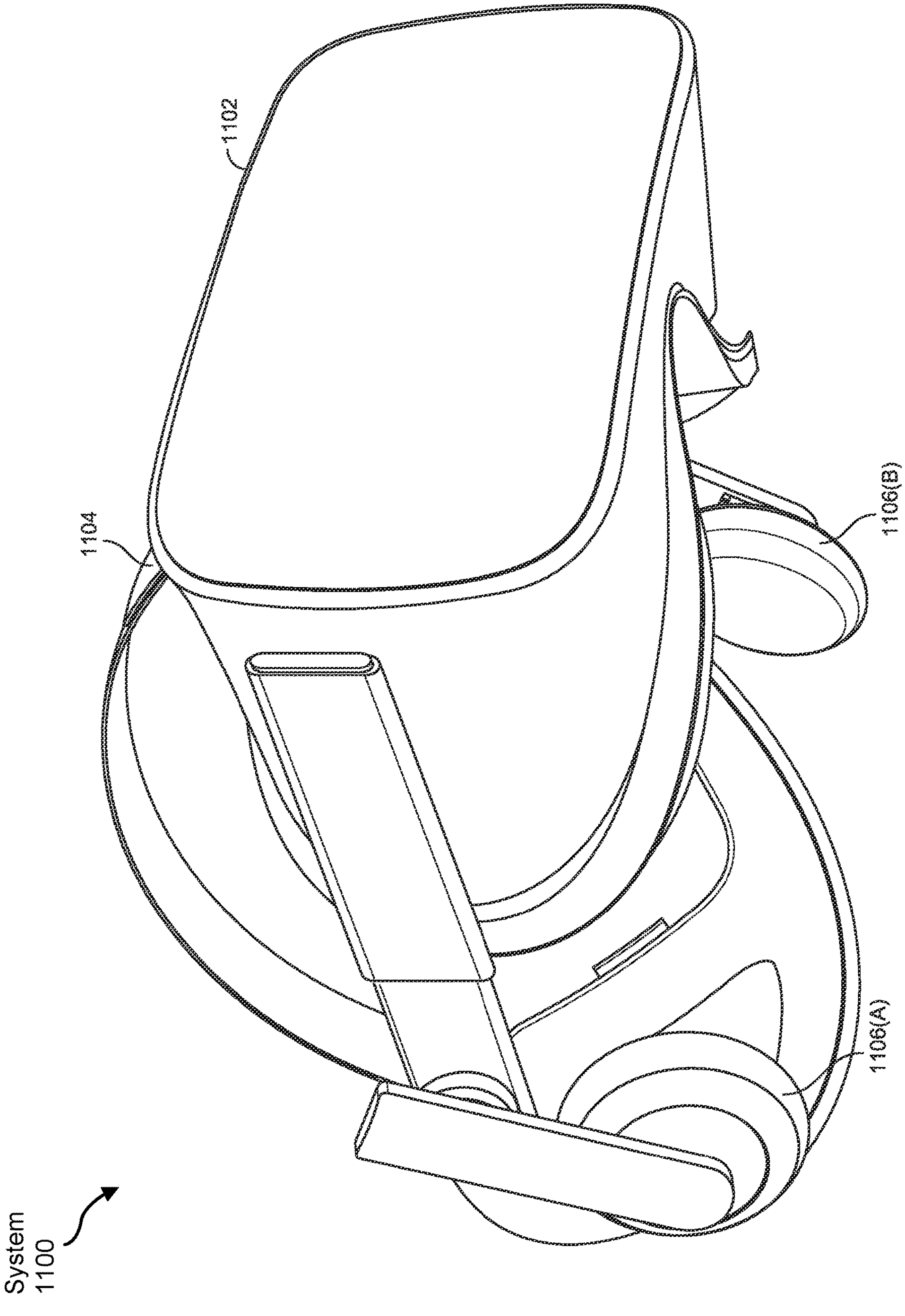
FIG. 11 is an illustration of an exemplary virtual-reality headset that may be used in connection with one or more implementations of this disclosure.

Turning to FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof.

In some examples, augmented-reality system 1000 may also include a microphone array with a plurality of acoustic transducers 1020(A)-1020(J), referred to collectively as acoustic transducers 1020. Acoustic transducers 1020 may represent transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(1) and 1020(J), which may be positioned on a corresponding neckband 1005.

In some embodiments, one or more of acoustic transducers 1020(A)-(J) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna, behind the tragus, and/or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), AR system 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments acoustic transducers 1020(A) and 1020(B) may be connected to augmented-reality system 1000 via a wireless connection (e.g., a BLUETOOTH connection). In still other embodiments, acoustic transducers 1020(A) and 1020(B) may not be used at all in conjunction with augmented-reality system 1000.

Acoustic transducers 1020 on frame 1010 may be positioned in a variety of different ways, including along the length of the temples, across the bridge, above or below display devices 1015(A) and 1015(B), or some combination thereof. Acoustic transducers 1020 may also be oriented such that the microphone array is able to detect sounds in a wide range of directions surrounding the user wearing the augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers, other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a stand-alone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-today activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(I) and 1020(J)) that are part of the microphone array (or potentially form their own microphone subarray). Neckband 1005 may also include a controller 1025 and a power source 1035.

Acoustic transducers 1020(I) and 1020(J) of neckband 1005 may be configured to detect sound and convert the detected sound into an electronic format (analog or digital). In the embodiment of FIG. 10, acoustic transducers 1020(I) and 1020(J) may be positioned on neckband 1005, thereby increasing the distance between the neckband acoustic transducers 1020(I) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

Power source 1035 in neckband 1005 may provide power to eyewear device 1002 and/or to neckband 1005. Power source 1035 may include, without limitation, lithium-ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1100 in FIG. 11, that mostly or completely covers a user's field of view. Virtual-reality system 1100 may include a front rigid body 1102 and a band 1104 shaped to fit around a user's head. Virtual-reality system 1100 may also include output audio transducers 1106(A) and 1106(B). Furthermore, while not shown in FIG. 11, front rigid body 1102 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1000 and/or virtual-reality system 1100 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1000 and/or virtual-reality system 1100 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1000 and/or virtual-reality system 1100 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An apparatus comprising:

an eyewear frame dimensioned to be worn by a user; and a plurality of radar devices secured to the eyewear frame, wherein the plurality of radar devices each comprise a transmitter element, and wherein the plurality of radar devices are each configured to:

transmit a signal toward a respective facial feature of the user; and receive the signal from the respective facial feature of the user, wherein at least one of the respective facial feature is a mouth of the user, wherein at least some of the plurality of radar devices are arranged to aim toward the mouth of a user.

2. The apparatus of claim 1, further comprising circuitry configured to:

process the signals received by the plurality of radar devices; and detect one or more facial expressions of the user based at least in part on the signals.

3. The apparatus of claim 2, wherein the circuitry is configured to animate an avatar of the user based at least in part on the one or more facial expressions.

4. The apparatus of claim 3, wherein the circuitry is configured to provide the avatar of the user for presentation on a display device such that the animation of the avatar is visible on the display device.

5. The apparatus of claim 3, further comprising at least one additional radar device secured to a bridge of the eyewear frame.

6. The apparatus of claim 1, wherein the plurality of radar devices comprise:

a first radar device that transmits a first signal toward the facial feature of the user; and a second radar device that receives the first signal after having bounced off the facial feature of the user.

7. The apparatus of claim 1, wherein the plurality of radar devices are synchronized with one another via at least one of:

a common clock signal; or one or more signal strength measurements.

8. The apparatus of claim 1, wherein:

the eyewear frame comprises a front frame and a pair of optical elements installed in the front frame; and the plurality of radar devices are secured to the front frame underneath the pair of optical elements.

9. The apparatus of claim 1, wherein at least one of the plurality of radar devices is secured to a temple of the eyewear frame.

10. The apparatus of claim 1, wherein at least one of the plurality of radar devices is secured to a hinge of the eyewear frame.

11. The apparatus of claim 1, wherein the plurality of radar devices comprise a set of millimeter-wave radar devices.

12. The apparatus of claim 1, wherein the respective facial feature toward which the signal is transmitted further comprises at least one of:

an eyebrow of the user;

an eyelid of the user;

or a forehead of the user.

13. An artificial-reality system comprising:

an eyewear frame dimensioned to be worn by a user;

a plurality of radar devices secured to the eyewear frame, wherein the plurality of radar devices each comprise a transmitter element, and wherein the plurality of radar devices are each configured to:

transmit a signal toward a respective facial feature of the user; and receive the signal from the respective facial feature of the user, wherein at least one of the respective facial feature is a mouth of the user, wherein at least some of the plurality of radar devices are arranged to aim toward the mouth of a user; and an output device configured to facilitate presentation of an avatar of the user.

14. The artificial-reality system of claim 13, further comprising circuitry configured to:

process the signals received by the plurality of radar devices; and detect one or more facial expressions of the user based at least in part on the signals.

15. The artificial-reality system of claim 14, wherein the circuitry is configured to animate the avatar of the user based at least in part on the one or more facial expressions.

16. The artificial-reality system of claim 15, wherein the circuitry is configured to provide the avatar of the user for presentation on the output device such that the animation of the avatar is visible on the output device.

17. The artificial-reality system of claim 13, wherein the plurality of radar devices comprise:

a first radar device that transmits a first signal toward the facial feature of the user; and a second radar device that receives the first signal after having bounced off the facial feature of the user.

18. The artificial-reality system of claim 13, wherein the plurality of radar devices are synchronized with one another via at least one of:

a common clock signal; or one or more signal strength measurements.

19. A method comprising:

securing a plurality of radar devices to an eyewear frame, each radar device comprising a transmitter element;

configuring the plurality of radar devices to transmit signals toward at least one respective facial feature of a user and receive the signals from the at least one respective facial feature of the user, wherein one of the respective facial feature towards which one or more of the signals are transmitted is a mouth of the user, wherein at least some of the plurality of radar devices are arranged to aim toward the mouth of a user; and configuring circuitry to detect one or more facial expressions of the user based at least in part on the signals.

* * * * *